Aug. 17, 1948.  LE ROY A. GRIFFITH  2,447,331
CONTROL APPARATUS
Filed May 1, 1943  2 Sheets-Sheet 1
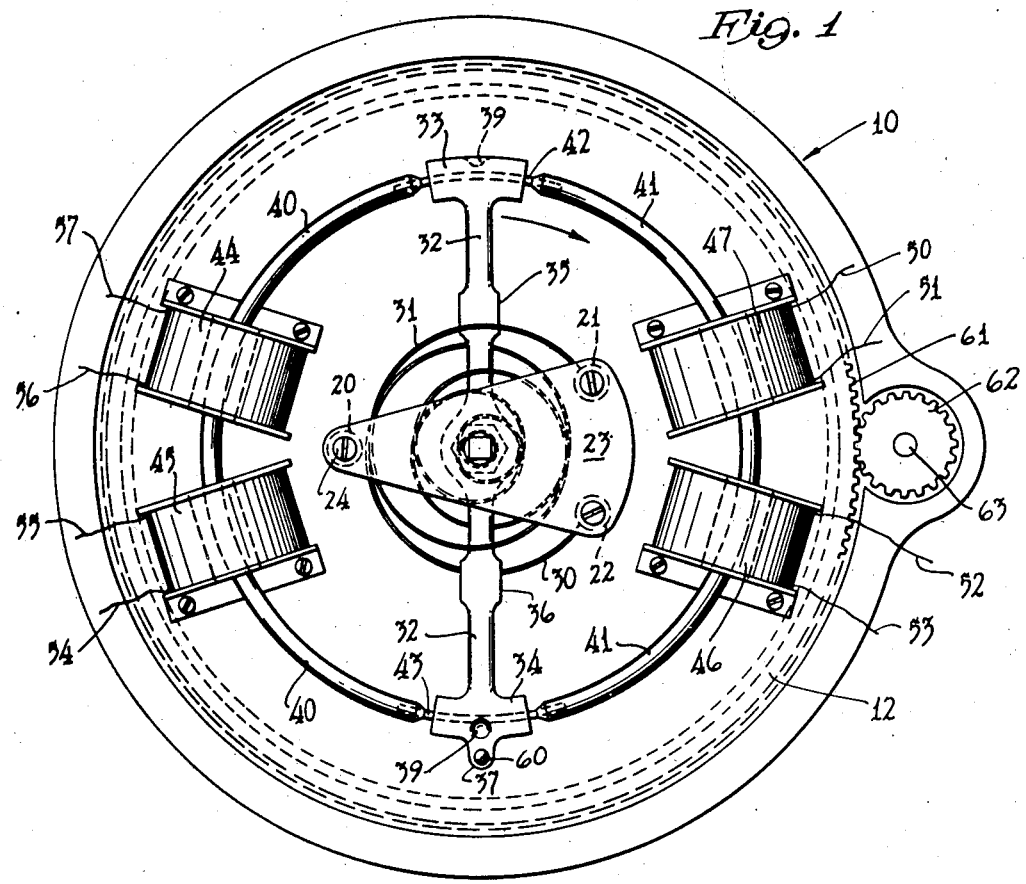
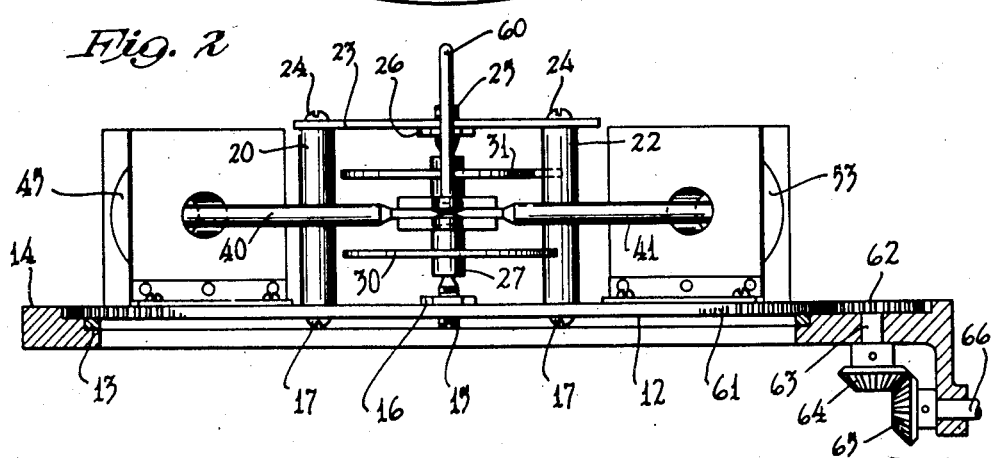
Inventor
LeRoy A. Griffith
By George H Fisher
Attorney Patented Aug. 17, 1948

2,447,331

UNITED STATES PATENT OFFICE 2,447,331

CONTROL APPARATUS

Le Roy A. Griffith, Minneapolis, Minn., assignor to Minneapolis-Honeywell Regulator Company, Minneapolis, Minn., a corporation of Delaware Application May 1, 1943, Serial No. 485,296

6 Claims. (Cl. 323—83)

My invention relates to control apparatus, and particularly to devices whereby the rotational position of a controlling member is made effective at a distance to operate an indicator or to actuate some sort of controlled device. A number of devices having this purpose have already been patented, based on various physical principles, and having various degrees of specialized or general usefulness. My invention belongs to that class of these devices in which a mechanical connection is made between the member whose movement is to act as a controller, and the pick-up portion of the controlling circuit. It is obvious that devices of this nature must present a minimum amount of interference with the operation of the controlling member itself; that they must operate with a minimum amount of friction and with a minimum additional load on the controlling member at all times. It is further desirable that any direct electrical connection between the control circuit and the controlling member be avoided if possible.

A typical example of the type of device which is to be found in the prior art for the purpose for which my invention is adapted, may be represented by a contact arm carried by the controlling member for rotation with it, and a resistance winding of the potentiometer type adapted to cooperate with the contact arm so that the resistance in an electrical circuit may be varied as the angular position of the contact arm varies. In applications where a considerable amount of power is available for operating the device, such an expedient is doubtless very satisfactory. However, where only a limited amount of power is available, or where only a limited movement of the controlling member may take place, such a device is obviously impractical. In the first case, the degree of mechanical resistance offered by the contact arm to movement along the potentiometer winding is considerable and may be sufficient to entirely inhibit operation of the controlling member. In the second case, an adjustment of this nature is a step by step adjustment, in which the minimum amount of variation is represented by one turn of wire. Where only a small amount of movement of the controlling member is possible, steps of this magnitude might be so large comparatively as to make control by this means erratic and uncertain. It should also be remembered that on continued use the accuracy of this potentiometer suffers due to wear, accumulation of dust, etc.

It is an object of my invention to provide an improved position-responsive control apparatus.

Another object of my invention is to provide a control apparatus giving differential response to the angular position of a controlling member, in a continuous or stepless manner.

Another object of my invention is to provide means responsive to the position of a controlling member, having a high degree of sensitivity to the movement of the controlling member.

Yet another object of my invention is to provide an electrical control circuit responsive to the angular position of a controlling member and connected thereto mechanically, thus avoiding any interaction between the control circuit and any circuit in which the controlling member may be a part.

Still another object of my invention is to provide an electrical bridge circuit, of the inductance type, in which balance or unbalance of the bridge is brought about by varying the impedances of the various members simultaneously in a predetermined fashion.

Other objects and advantages of my invention will become apparent upon a study of the specification and claims, and of the various figures of the drawing which are appended hereto and which form a part hereof, and wherein Figure 1 is a plan view of an embodiment of a portion of my invention, parts being broken away;

Figure 2 is a partly sectional elevation of the device of Figure 2; and

Figure 3:
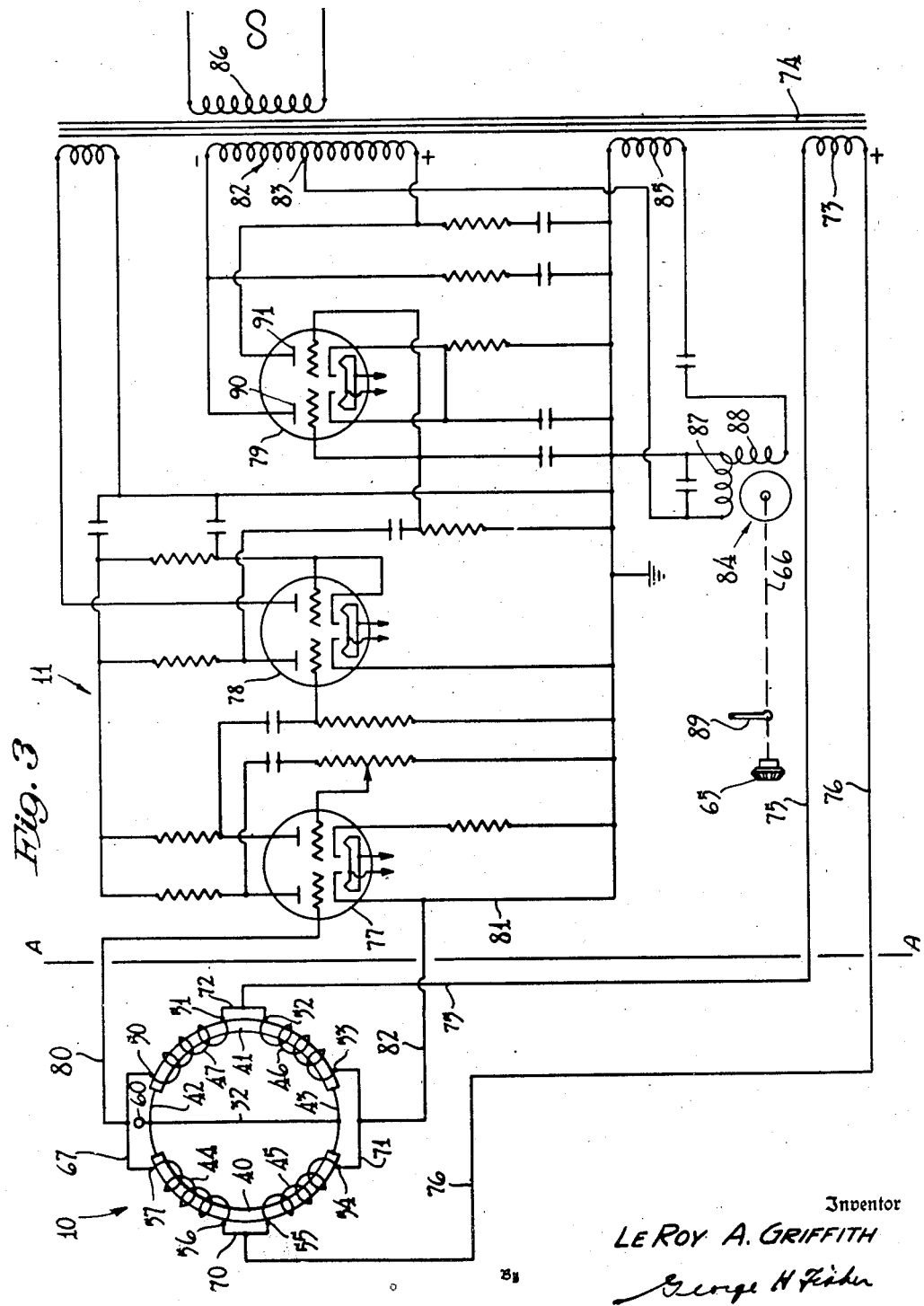
Figure 3 is a diagrammatic showing of a control system embodying my invention.

I have diagrammatically presented in the drawing what I consider to be an improved embodiment of my device, but it will be readily understood as the drawing is presented by way of illustration only, and that numerous changes are possible in keeping with the spirit of the invention.

Referring first to Figure 3, I have there shown an embodiment of my invention diagrammatically, and it will be seen that the invention is comprised of an electromagnetic pick-up element 10 and an amplifier and motor control circuit 11. That part of the drawing in Fiugre 3 to the right of the line A—A is a representation of a suitable motor control amplifier circuit which I prefer to use and which is disclosed and claimed in the patent to Albert P. Upton, 2,423,524, issued July 8, 1947, and assigned to the assignee of the present application. However, I do not consider my invention to be limited to use in combination with this particular amplifier, since it is equally satisfactory with any amplifier having the desired characteristics.

I now refer to Figures 1 and 2 which more completely and particularly show the details of my electromagnetic pick-up device 10. This device comprises a circular base plate 12 which may be mounted for rotation about its center in any conventional fashion. For purposes of illustration, I have shown this base plate as being received in an annular recess 13 in a supporting member 14. The base plate is drilled and tapped at its center to receive a pivot screw 15 held in place in proper adjustment by a lock nut 16.

Base plate 12 is also drilled at selected points for the passage of screws 17, threadedly received in the ends of rods 20, 21, and 22. Fashioned to cooperate with these rods is a top plate 23, drilled to pass screws 24 which are threadedly received into the other ends of rods 20, 21, and 22. Top plate 23 is also drilled and tapped centrally to receive a pivot screw 25 which is held in place by a lock nut 26.

Supported for rotation on the pivot screws 25 and 15 is a shaft 27. One end of each of a pair of hair springs 30 and 31 is fastened to shaft 27 in any conventional manner, as by being pinned in. The other ends of the two hair springs are fastened respectively to rods 21 and 22. The relation between the hair springs and the rods and shaft is such that the two hair springs tend to rotate the shaft in opposite directions, thus biasing it to assume a certain rotated position with respect to the base and top plates.

Fastened to shaft 27 for rotation therewith is an arm 32 having enlarged bifurcated ends 33 and 34. Located at a suitable distance from the center are a pair of bosses 35 and 36, so that upon extreme rotation of the arm 32 about its center, one or the other of these bosses may come into contact with rod 21 or rod 22, as the case may be, to act as a stop. Bifurcation 34 is provided with an extending tongue portion 37. Arm 32 is of magnetically non-reactive material, and supports at diametrically opposite points a generally annular member comprising rods 40 and 41 of iron or other magnetically reactive material and rods 42 and 43 of magnetically non-reactive material. The latter rods pass through the bifurcations in the enlarged end portions of arm 32, and are held there in some conventional fashion as by staking 39. Members 40, 41, 42 and 43 are secured together in end to end relation by any suitable means. I have illustrated the non-magnetic rods as fitting into holes drilled in the iron rods, and being soldered therein. The annulus is arranged for rotation about its center in its own plane.

Two pairs of electromagnetic coils of electrically conducting wire having hollow centers, 44 and 45, and 46 and 47, respectively, are mounted on base plate 12 in such a fashion that the axis of the annulus passes through the hollow centers of all the coils. The coils of the respective pairs are relatively closely spaced around the perimeter of the annulus, and so arranged with respect to the normal position of the annulus (maintained by coil springs 30 and 31) that one of the iron rods 40 and 41 projects equally from both sides of each pair of coils, but they are not arranged to abut one another for purposes to be lated noted. The hollow coils are of such size as to permit the annulus to rotate freely therein. Coils 44, 45, 46, and 47 are provided with terminals 57, 56, 55, 54, 53, 52, 51, and 50, respectively.

Pressed, soldered or otherwise secured to the projecting tongue 37 of arm 32 is a rod 60 whereby mechanical connection may be made with arm 32 for causing it to rotate about its center, as for example by the operation of a thermostatic bimetal arm.

I have shown base plate 12 as being provided with gear teeth 61 for the purpose of engaging with a gear 62 mounted on a shaft 63 which is journaled in supporting member 14, and which bears on its other end a bevel gear 64. A cooperating bevel gear 65 is shown carried by a shaft 66, for purposes which will later be set forth.

Referring now to Figure 3, it will be seen that terminals 50 and 57 of coils 47 and 44, respectively, are electrically joined as by a conductor 67: in the same way terminals 56 and 55 are joined by conductor 70, terminals 54 and 53 are joined by conductor 71, and terminals 51 and 52 are joined by conductor 72. The coils 44, 45 and similarly 46, 47 are positioned and connected to form sets of coils in legs of a bridge circuit, to the input which acts magnetically in opposition to one another. Conductors 70 and 72 are respectively joined with the terminals of a secondary winding 73 of a transformer 74 as by conductors 75 and 76. Conductor 67 is connected with the grid of the first tube 77 of the amplifier as by conductor 80. Conductor 71 is connected to the ground conductor 81 of the amplifier as by conductor 82. Thus it will be seen that the four coils so connected comprise the four arms of an impedance bridge in which the power is supplied at 70 and 72 and the indication is taken off at 67 and 71.

As I have stated above, the details of the amplifier and motor control unit 11 illustrated in this application are not intended to limit the use of my invention. However, for the sake of making my present application complete, I subjoin a brief description of this device and its application.

The amplifier comprises two stages of amplification in the tube 77 and one further stage of amplification and one stage of rectification in tube 78. Power is supplied to the plates of a double triode 79 as by a secondary winding 82 of transformer 74. The center tap 83 of this secondary winding is connected to one end of a first field winding 87 of a split phase motor indicated generally at 84. The other end of the first field winding is joined with one end of a second field winding 88 of the motor, and is connected to ground. As shown, field winding 88 is provided with current from a third secondary winding 85 of transformer 74. It will thus be seen that during each half cycle of the current supplied to the primary 86 of transformer 74, either plate 90 or plate 91 of tube 79 will be positive and the other plate will be negative. Thus there will be two possible circuits through winding 87 of the motor 84. The first passes out from the center tap 83 of the secondary winding 82 and passes through the winding 87, thence to the cathodes of tube 79, thence to plate 90, returning to the secondary 82. The second starts from the center tap 83 of secondary winding 82, passes through the winding 87 of motor 84, thence to the cathodes of tube 79, thence to plate 91, returning to the secondary 82. It will be seen that these two paths will be taken by currents which are 180 degrees out of phase and that therefore the current in winding 87 of the motor will either lead or lag the current in the other winding. The presence of a signal on the grids of tube 79 will act to increase or decrease passage of current from the cathode to a particular plate, depending upon whether the phase of the signal is the same as the phase of the potential appearing on the particular plate or out of phase with that potential. My electromagnetic pick-up is a mechanical device for varying the phase and magnitude of the signal impressed upon the first stage 77 of the amplifier and therefore upon the grids of tube 79.

The magnetic pick-up device as disclosed herein is one which operates on the principle of self-induction in which the main flux path for the coil is through the iron bar and is completed through the air path. The reluctance of this path for the magnetic flux varies for different positions of the armature and hence the self-induction of the coil varies. This causes a change in inductive reactance or impedance of the coils and upsets the balance of the bridge. When the annular armature is in the position as shown in Figure 1, equal amounts of iron are within and extend from the electrically equal coils, the return air path for each coil being the same and the bridge being balanced. Considering the device in the position which occurs when the armature is rotated in a direction shown by the arrow in Figure 1, it will be noted that a larger amount of iron extends from coils 44 and 46 placing a greater amount of iron in the main flux path of iron and air for these coils and a smaller amount of iron extends from coils 45 and 47 placing a lesser amount of iron in the main flux path of iron and air for these coils. This causes a change in the inductive reactance or impedance of the coils such that the impedances of coils 44 and 46 are increased to a very slight extent and the impedances of coils 45 and 47 are noticeably decreased. The reason for the slight effect on coils 44 and 46 is that there is a limit to which the increased length or amount of iron in the flux path is effective and the flux lines tend to leave the iron path even though it extends beyond such limit. On the other hand, a decrease in the length of iron within this flux path is noticeably effective. The bridge is then unbalanced and the signal potential appears upon conductors 80 and 82 which is in phase with the potential impressed upon the bridge by conductors 75 and 76. Under these conditions, the voltage across field winding 87 of the motor is in phase with the voltage across the other field winding, and the motor rotates in a forward direction. It should be noted that under the above conditions there will be at all times a portion of the iron core extending completely through the hollow center of all of the coils and only that portion of the core external of the confines of the coil is utilized to effect this change in impedance. The coils themselves, since the core extends completely through each coil, will not be effected by a solenoid effect and hence the sensitivity of the device will not be impaired.

Now suppose the armature be rotated in the opposite direction from that shown by the arrow in Figure 1. In this case a larger amount of iron extends from the coils 45 and 47 and a smaller amount of iron extends from coils 44 and 46. The impedances of coils 45 and 47 are increased to a slight extent and the impedances of coils 44 and 46 are noticeably decreased for the same reasons as given above. Under these conditions the bridge is again unbalanced but the unbalance this time is in the opposite direction and causes a signal potential to appear across conductors 80 and 82 which is 180° out of phase with the potential across conductors 75 and 76. The other plate of tube 79 now conducts, the current in the field winding 87 of the motor is out of phase with the current in the other field winding and the motor operates in a reverse direction.

Shaft 66 of motor 84 may be used to operate any desired indicating or controlling instrument 89, and it is also arranged, as shown in Figure 2, to operate gear 62. Rod 69 still being maintained in its position by the controlling member, rotation of base plate 12 by means of gear 62 causes the coils to return to the normal relation shown in Figure 1 with respect to the armature, the unbalance of the bridge disappears, and operation of the motor ceases. Thus it will be seen that rotation of the armature through an angle has caused rotation of an operated member through a proportionate angle, and the completion of the operating cycle has brought about a new condition of balance in the system.

While I have illustrated a preferred embodiment of my invention, it is obvious that many other modifications and adaptations of the invention will occur to those skilled in the art. Therefore, it should be clearly understood that the invention is not to be limited only to that form shown and described, but rather by the scope of the appended claims.

I claim as my invention:

1. A position responsive device comprising a plurality of sets of hollow inductors, means mounting said inductors substantially along the circumference of a circle with their respective axes tangent thereto and spaced apart to substantially reduce mutual inductance therebetween, a like plurality of magnetic members having the general configuration of portions of an annulus having the same radius as said circle, means mounting said members and cooperating therewith to comprise an annular armature traversing said inductors, means supporting said armature for pivotal movement about the center of said circle in the plane thereof, and means mutually rotating said plurality unitarily, whereby differential coaction may take place therebetween and whereby further said differential coaction may result in variations in inductive reactance in said inductors.

2. In a control instrument, an adjustable member, an actuated member, means mounting said actuated member for pivotal movement with respect to said adjustable member, means resiliently urging said actuated member to take a predetermined position with respect to said adjustable member, and means pivotally adjusting said adjustable member with respect to said actuated member, said adjustable member comprising pairs of hollow inductance coils connected in a normally energized electrical bridge and located in spaced diametrically opposed relationship about a circle to which their axes are tangent, said coils being spaced apart from one another to substantially reduce mutual inductance therebetween, said actuated member including a closed annulus, having relatively short nonmagnetic portions and relatively long magnetic portions, and a supporting arm for said annulus, each said magnetic portion of said armature at all times completely traversing both coils of one of said pairs.

3. A position responsive device comprising a plurality of sets of inductors, a like plurality of substantially semicircular magnetic members of a substantially uniform cross-sectional area extending in inductive relationship with said inductors, means connecting said inductors to comprise arms of a normally energized electrical bridge circuit, means mutually rotating said pluralities unitarily with said magnetic members in inductive relationship with said inductors for the full length of the latter in all relative positions of said pluralities, whereby the inductance of said inductors is differentially affected resulting in variations of the inductive reactance of said inductors with only a relatively small force being exerted upon said magnetic members by said inductors, said plurality of magnetic members being included in an armature in the form of an annulus and being supported for rotation substantially in the plane of that annulus.

4. A position responsive device comprising a plurality of sets of coils, each of said coils being displaced from one another to substantially reduce mutual inductance therebetween, a like plurality of magnetic members magnetically insulated from one another, means connecting said coils to comprise a normally energized electrical bridge circuit, means mutually rotating said pluralities unitarily, whereby differential coaction may take place therebetween and whereby further differential coaction may result in a variation of the inductive reactance of each of said coils, said plurality of said magnetic members being included in an armature, said magnetic members being generally in the form of portions of an annulus, and being further supported for rotation substantially in the plane of the annulus, and means continuously urging said plurality of magnetic members to take a selected position relative to said plurality of said coils.

5. In a control instrument, an adjustable member including a plurality of sets of coils positioned in diametrically opposed relationship, the coils of each set being spaced apart to substantially reduce mutual inductance therebetween, said coils being connected to form a normally energized electrical bridge circuit, an actuated member including a pair of substantially semicircular magnetic members pivotally mounted for movement with respect to said adjustable member, each of said magnetic members completely traversing a set of coils in all positions of relative movement, means biasing said actuated member to a predetermined position relative to said coils, and means moving said actuated member relative to said adjustable member to vary the inductive reactance of said coils, said bridge circuit having an output which is variable in phase and magnitude.

6. A position responsive device comprising a plurality of sets of inductors, a like plurality of magnetic members extending in inductive relationship with said inductors, each of said magnetic members being of a predetermined length such that at least one extremity of said magnetic members will always be within the confines of a flux path for an individual inductor, means energizing said inductors from a common source, and means mutually moving said pluralities unitarily with said magnetic members in inductive relationship with said inductors for the full length of the latter in all relative positions of said pluralities whereby the self-inductance of said inductors is varied causing a variation of the inductive reactance of said inductors with only a relatively small force being exerted upon said magnetic members by said inductors.

LE ROY A. GRIFFITH.

REFERENCES CITED

The following references are of record in the file of this patent:

UNITED STATES PATENTS

| Number | Name | Date |
|---|---|---|
| 1,070,651 | Wood | Aug. 19, 1913 |
| 2,053,409 | Urfer | Sept. 8, 1936 |
| 2,154,375 | Chambers | Apr. 11, 1939 |
| 2,252,053 | Watson | Aug. 12, 1941 |
| 2,276,822 | Bowman et al. | Mar. 17, 1942 |

FOREIGN PATENTS

| Number | Country | Date |
|---|---|---|
| 555,042 | Germany | July 19, 1932 |